US012103032B2

United States Patent
(12) United States Patent
Donati et al.

(10) Patent No.: US 12,103,032 B2
(45) Date of Patent: Oct. 1, 2024

(54) LIQUID PRODUCT DISTRIBUTION ASSEMBLY

(71) Applicants: Dario Donati, Phoenix, AZ (US); Gloria Bolam, Phoenix, AZ (US)

(72) Inventors: Dario Donati, Phoenix, AZ (US); Gloria Bolam, Phoenix, AZ (US)

(*) Notice: Subject to any disclaimer, the term of this patent is extended or adjusted under 35 U.S.C. 154(b) by 202 days.

(21) Appl. No.: 17/853,863

(22) Filed: Jun. 29, 2022

(65) Prior Publication Data

US 2024/0001400 A1 Jan. 4, 2024

(51) Int. Cl.
*B05C 11/10* (2006.01)
*A47K 5/12* (2006.01)

(52) U.S. Cl.
CPC ........ *B05C 11/1026* (2013.01); *A47K 5/1204* (2013.01); *A47K 5/1211* (2013.01)

(58) Field of Classification Search
CPC ............................ A47K 5/1204; A47K 5/1211
USPC .................................................. 222/135, 138
See application file for complete search history.

(56) References Cited

U.S. PATENT DOCUMENTS 1,186,181 A 6/1916 Gage
3,381,312 A * 5/1968 Whitla ................... A47K 3/281 4/662
3,742,520 A * 7/1973 Bernardi ................. E03D 9/002 4/662
4,132,242 A * 1/1979 Carroll, Jr. ............ D06F 39/022 222/61
5,114,048 A * 5/1992 Minke ........................ E03C 1/04 222/135
5,174,476 A 12/1992 Steiner
6,006,388 A 12/1999 Young
6,055,831 A * 5/2000 Barbe ................... D06F 39/022 222/145.5
6,098,843 A * 8/2000 Soberanis ............ B67D 7/0238 222/53
6,129,245 A * 10/2000 Redman ............... A47K 5/1204 222/105
6,206,241 B1 * 3/2001 Terrell ................. A47K 5/1204 222/372

(Continued)

FOREIGN PATENT DOCUMENTS

GB 2530290 A * 3/2016 ........... A47K 5/1217
WO WO2009101039 8/2009

(Continued)

*Primary Examiner* — Paul R Durand
*Assistant Examiner* — Michael J. Melaragno

(57) ABSTRACT

A liquid product distribution assembly for on demand dispensing of liquid products includes a set of reservoirs, to which a set of supply lines is attached, a set of pumps, to which a set of feeder lines is attached, and a set of communicators. Each reservoir is configured to hold a respective liquid product and is in fluidic communication with at least one supply line. Each supply line is operationally engaged to a respective pump and each pump is in fluidic communication with at least one feeder line. Each communicator is positioned proximate to an outlet port of a respective feeder line and is in communicative engagement with an associated pump. The communicator is positioned to communicate a liquid demand request to the associated pump to actuate the associated pump so that an associated liquid product is delivered through the outlet port.

10 Claims, 5 Drawing Sheets

(56) References Cited

U.S. PATENT DOCUMENTS

| | | | | |
|---|---|---|---|---|
| 6,269,975 | B2 * | 8/2001 | Soberanis | B01F 35/7543 222/1 |
| 7,364,053 | B2 * | 4/2008 | Ophardt | A47K 5/16 222/145.5 |
| 7,455,197 | B2 * | 11/2008 | Ophardt | A47K 5/16 222/145.5 |
| 8,182,236 | B2 * | 5/2012 | Shaimi | B01F 23/405 222/145.5 |
| 8,303,905 | B2 | 11/2012 | Brents | |
| 8,950,628 | B2 * | 2/2015 | Muderlak | A47K 5/1217 222/25 |
| 9,579,678 | B2 | 2/2017 | des Jardins | |
| 11,686,485 | B2 * | 6/2023 | Charillon | F24F 11/49 700/276 |
| 2007/0108230 | A1 * | 5/2007 | Doyle | A47K 5/1202 222/135 |
| 2010/0310765 | A1 | 12/2010 | Olsson | |
| 2011/0031272 | A1 * | 2/2011 | Comiskey | G01F 3/10 222/23 |
| 2015/0021356 | A1 * | 1/2015 | Witchell | B01F 33/848 222/23 |
| 2019/0059659 | A1 * | 2/2019 | Burgo, Sr. | A47K 5/1217 |
| 2019/0272494 | A1 * | 9/2019 | Bakir | G06Q 30/0635 |
| 2022/0018559 | A1 * | 1/2022 | Charillon | F24F 8/24 |
| 2022/0257067 | A1 * | 8/2022 | Pineau | A61L 2/0082 |
| 2022/0282464 | A1 * | 9/2022 | Fujimoto | E03C 1/08 |
| 2022/0298764 | A1 * | 9/2022 | Burgo, Sr. | E03C 1/046 |
| 2023/0148801 | A1 * | 5/2023 | Sempier | B60R 1/06 222/608 |
| 2023/0211030 | A1 * | 7/2023 | Lloyd | A61L 2/18 422/28 |
| 2024/0001400 | A1 * | 1/2024 | Donati | B05C 11/1026 |

FOREIGN PATENT DOCUMENTS

| | | | | |
|---|---|---|---|---|
| WO | WO-2015019082 | A1 * | 2/2015 | A47K 5/12 |
| WO | WO-2021014128 | A1 * | 1/2021 | A47K 5/1202 |

* cited by examiner

LIQUID PRODUCT DISTRIBUTION ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to product dispensing devices and more particularly pertains to a new product dispensing device for on demand dispensing of liquid products. The present invention discloses a product dispensing device that delivers liquid products to various sites in a building so that the liquid product is nearly always available to users.

(2) Description of Related Art Including Information Disclosed Under 37 CFR 1.97 and 1.98

The prior art relates to product dispensing devices, which may comprise liquid soap dispensers relying on hand operated pistons or selectively openable seals. Related prior art comprises systems for spraying disinfectant liquids. What is lacking in the prior art is a product dispensing device comprising an assembly of reservoirs, supply lines, pumps, feeder lines, and communicators that can selectively deliver liquid products to outlet ports of the feeder lines.

(H) BRIEF SUMMARY OF THE INVENTION

An embodiment of the disclosure meets the needs presented above by generally comprising a set of reservoirs, to which a set of supply lines is attached, a set of pumps, to which a set of feeder lines is attached, and a set of communicators. Each reservoir is configured to hold a respective liquid product and is in fluidic communication with at least one supply line. Each supply line is operationally engaged to a respective pump and each pump is in fluidic communication with at least one feeder line. Each communicator is positioned proximate to an outlet port of a respective feeder line and is in communicative engagement with an associated pump. The communicator is positioned to communicate a liquid demand request to the associated pump to actuate the associated pump so that an associated liquid product is delivered through the outlet port.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
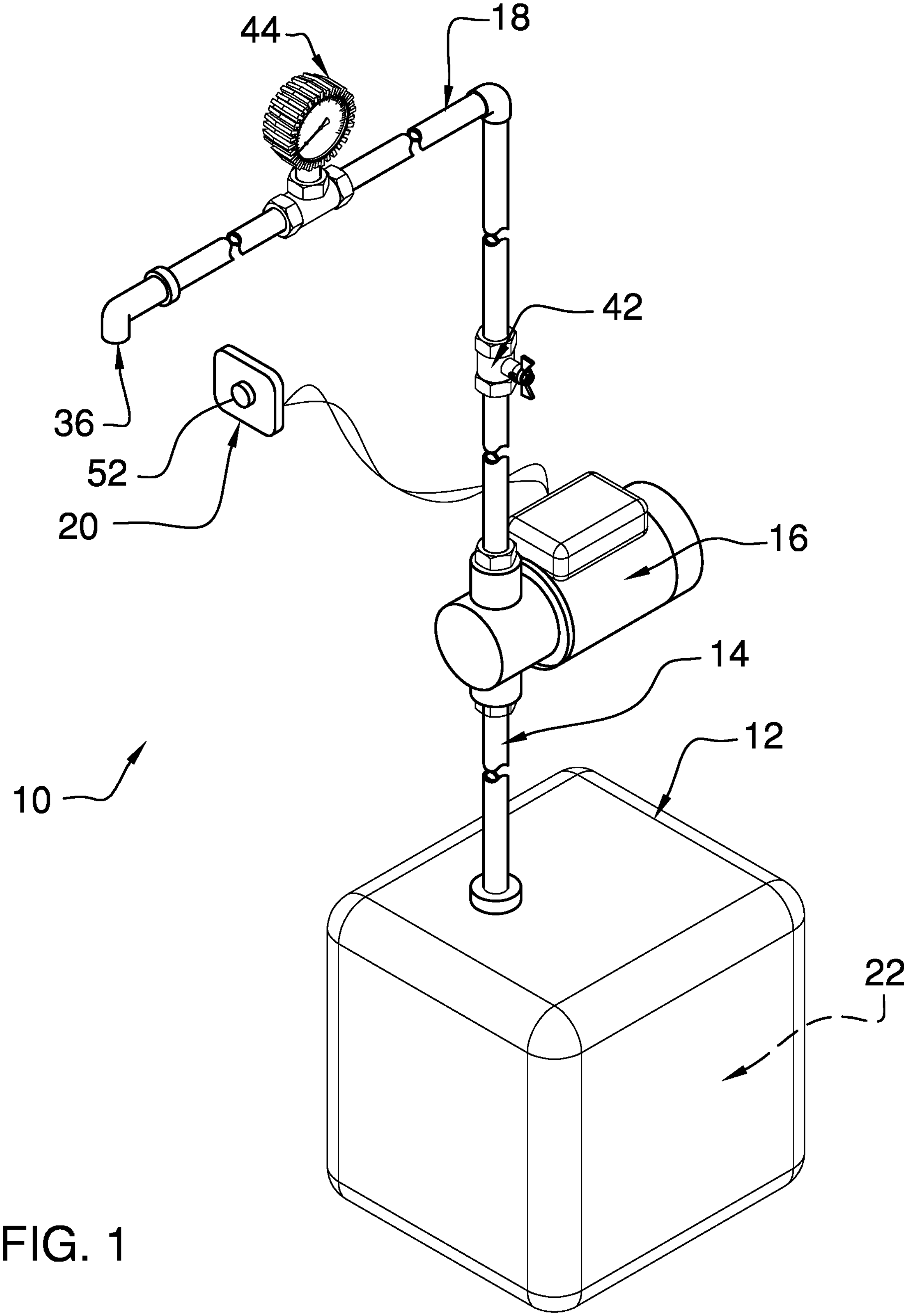
FIG. 1 is an isometric perspective view of a liquid product distribution assembly according to an embodiment of the disclosure.

With reference now to the drawings, and in particular to FIGS. 1 through 5 thereof, a new product dispensing device embodying the principles and concepts of an embodiment of the disclosure and generally designated by the reference numeral 10 will be described.

Figure 2:
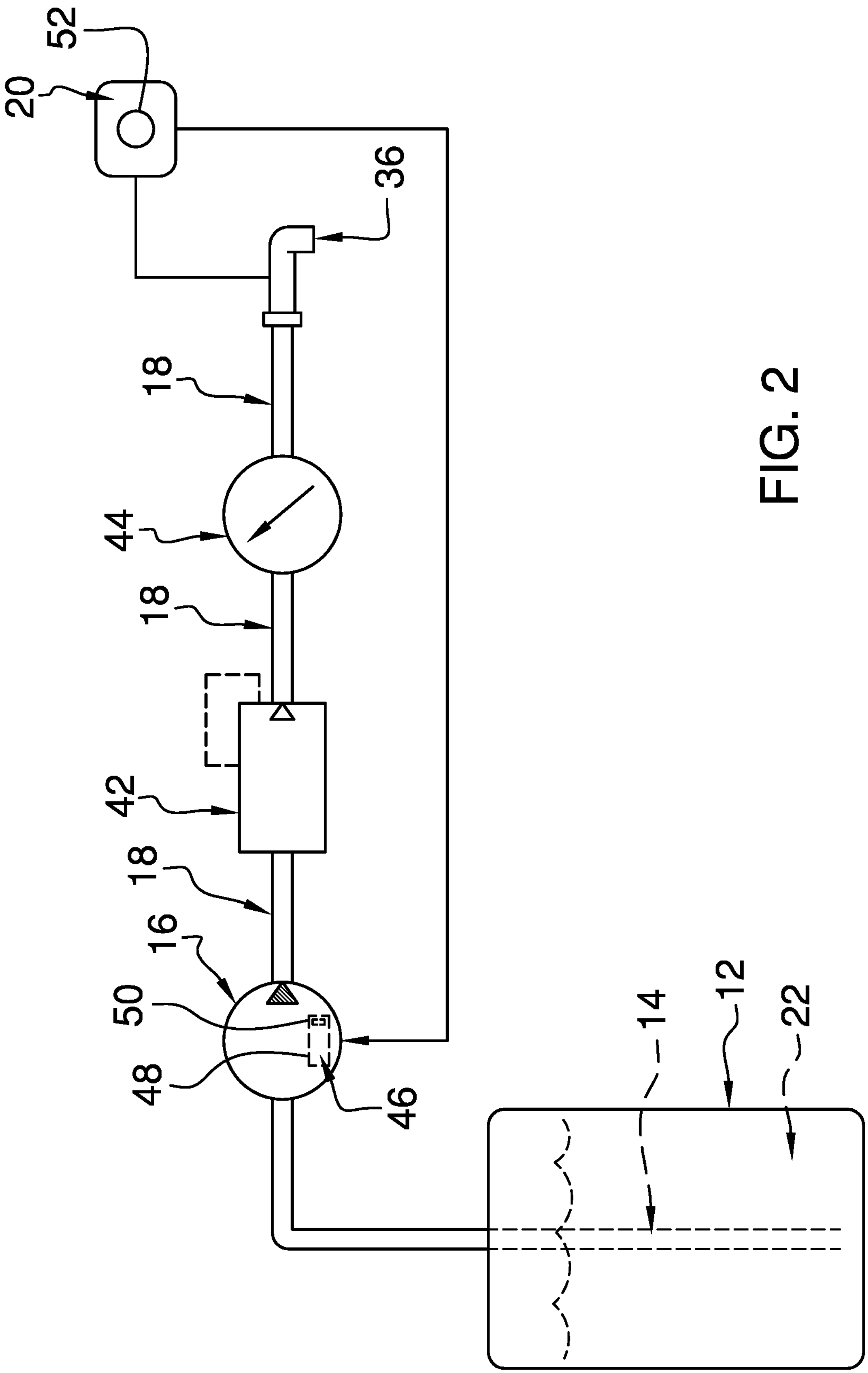
FIG. 2 is a flow diagram of an embodiment of the disclosure.
Figure 3:
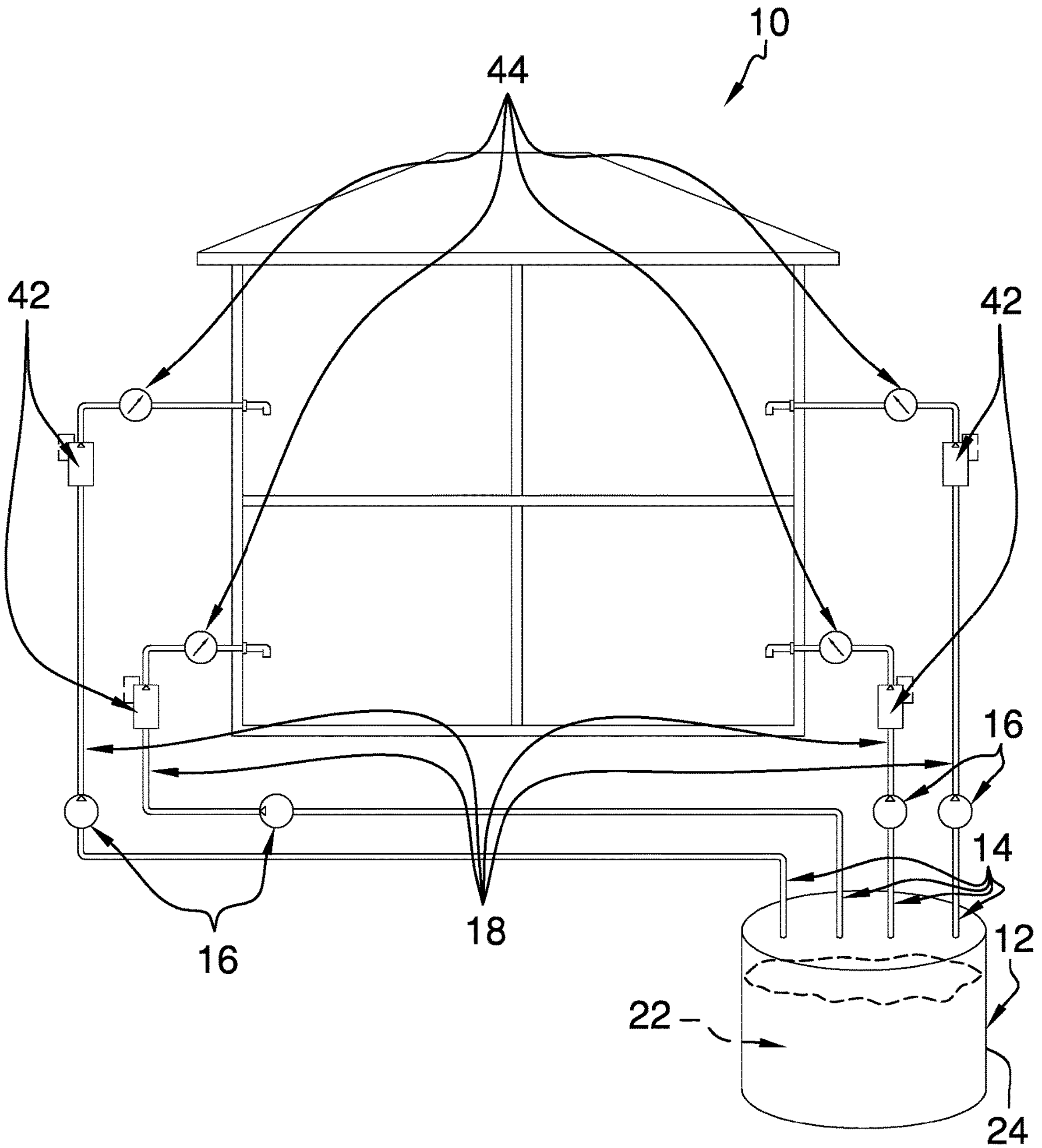
FIG. 3 is an in-use view of an embodiment of the disclosure.
Figure 4:
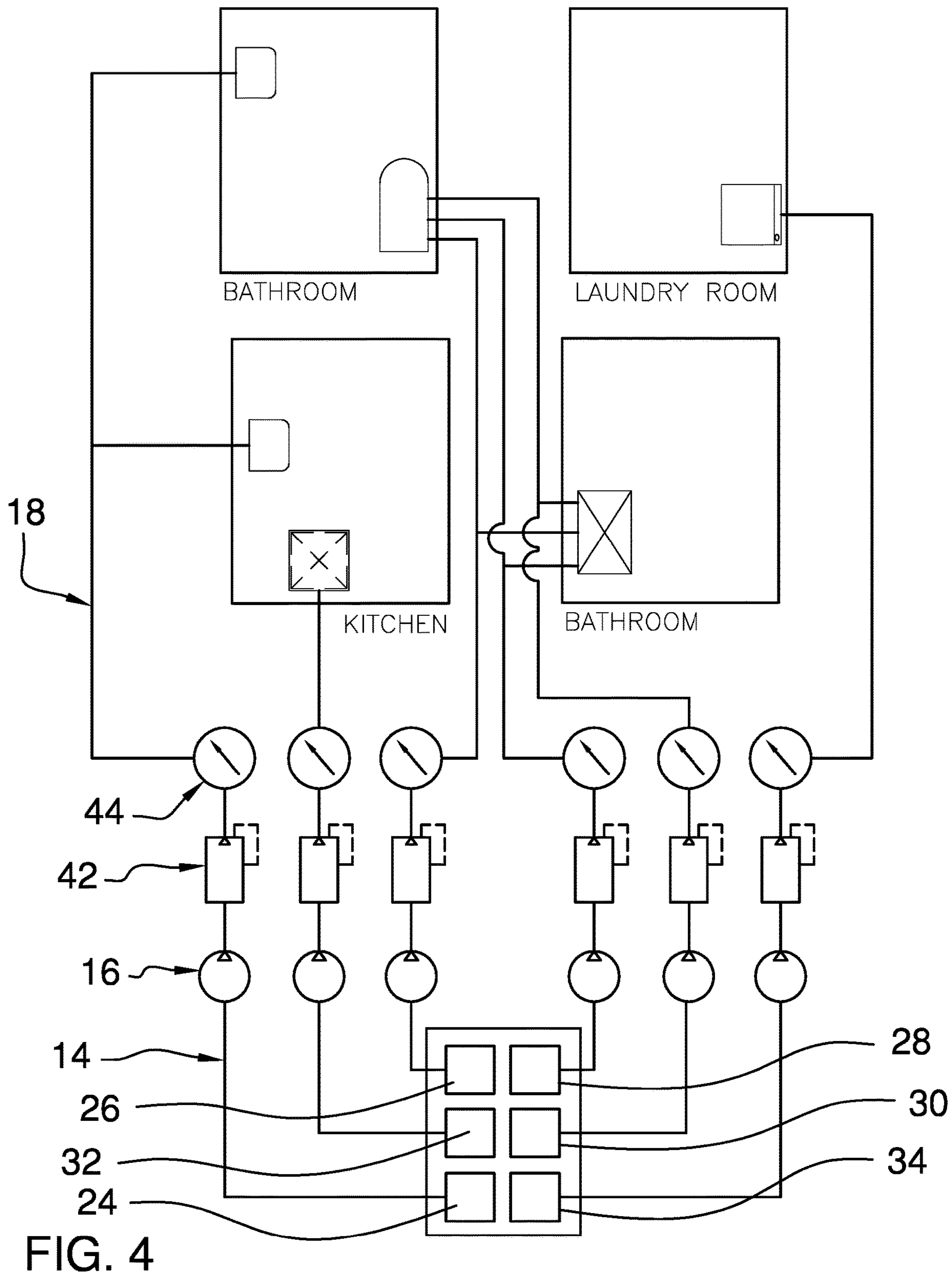
FIG. 4 is a block diagram of an embodiment of the disclosure.
Figure 5:
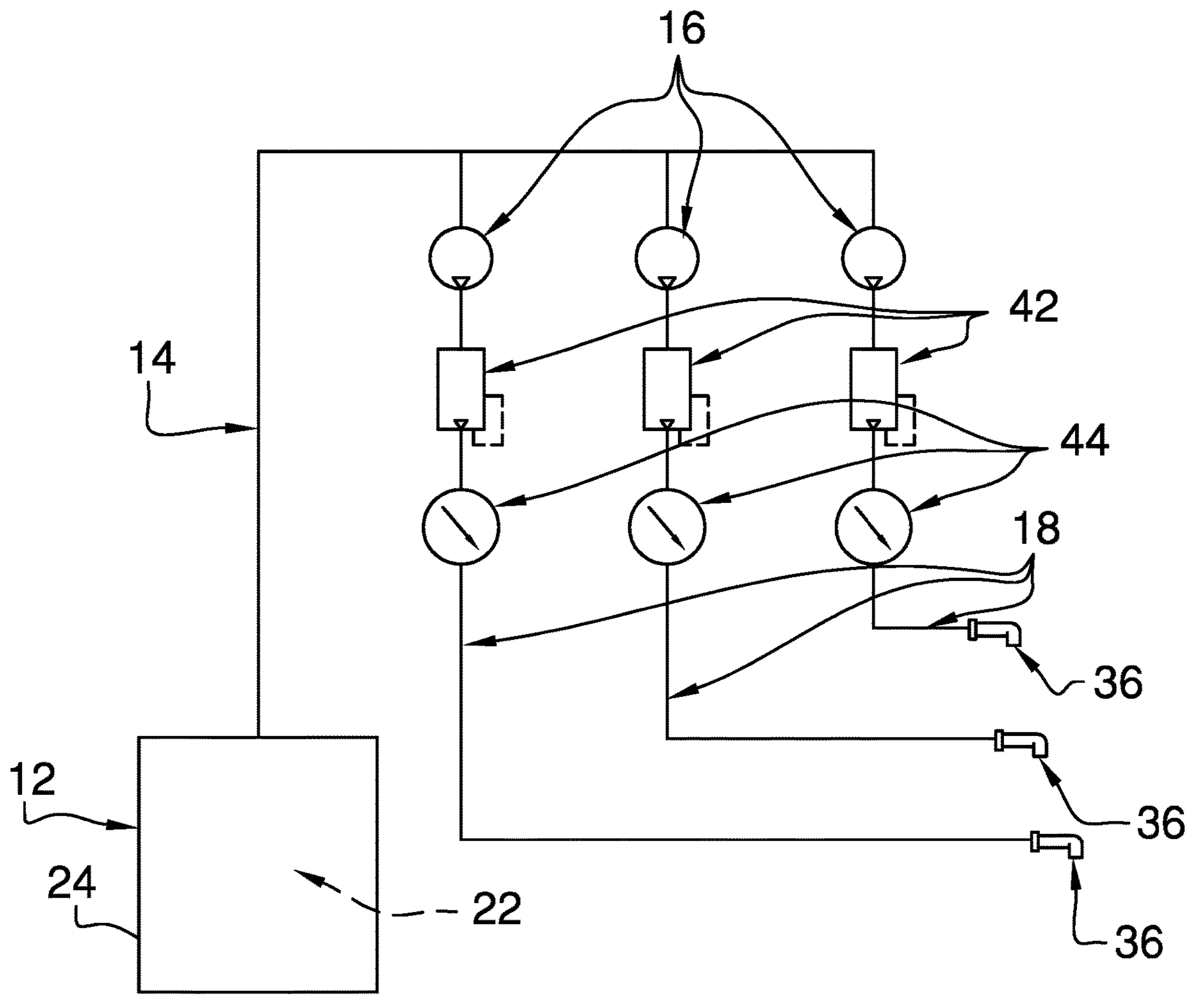
FIG. 5 is a block diagram of an embodiment of the disclosure.

As best illustrated in FIGS. 1 through 5, the liquid product distribution assembly generally comprises a set of reservoirs 12, to which a set of supply lines 14 is attached, a set of pumps 16, to which a set of feeder lines 18 is attached, and a set of communicators 20. Each reservoir 12 is configured to hold a respective liquid product 22 and is in fluidic communication with at least one supply line 14. The set of reservoirs 12 comprises at least one of a liquid hand soap container 24, a liquid shampoo container 26, a liquid hair moisturizer container 28, a liquid body soap container 30, a liquid dishwasher detergent container 32, and a liquid laundry soap container 34. As shown in FIG. 4, each pump 16 is supplied by a separate supply line 14, whereas, as shown in FIG. 5, one supply line 14 is supplying liquid product 22 to three pumps 16.

Each supply line 14 is operationally engaged to a respective pump 16 and each pump 16 is in fluidic communication with at least one feeder line 18. Each communicator 20 is positioned proximate to an outlet port 36 of a respective feeder line 18 and is in communicative engagement with an associated pump 16. The communicator 20 is positioned to communicate a liquid demand request to the associated pump 16 to actuate the associated pump 16 so that an associated liquid product 22 is delivered through the outlet port 36. As shown in FIG. 1, the communicator 20 comprises a wired connection 38, whereas in FIG. 2 the communicator 20 comprises a first transmitter 40.

The present invention is anticipated to address issues of supply of liquid products 22 within personal residences and commercial buildings. Often, small containers of liquid products 22 are supplied for use, and these frequently run empty and require changing. The reservoirs 12 of the present invention can be sized to meet the demand of personal residences and commercial buildings of various sizes so that liquid products 22 are nearly always available to users.

The liquid product 22 distribution assembly 10 also may comprise a set of valves 42, with each valve 42 being positioned in a respective feeder line 18 between an associated pump 16 and an outlet port 36 of the respective feeder line 18. The valve 42 is in communicative engagement with an associated pump 16 so that the valve 42 is actuated to an open configuration concurrent with actuation of the associated pump 16. As shown in FIGS. 3 and 5, each pump 16 is engaged to one feeder line 18, but the present invention also anticipates multiple feeder lines 18 extending from a single pump 16, or feeder lines 18 that split, as shown in FIG. 5.

The liquid product 22 distribution assembly 10 also may comprise a set of pressure gauges 44, with each pressure gauge 44 being positioned in a respective feeder line 18 so that each feeder line 18 is operationally engaged to a respective pressure gauge 44. The pressure gauge 44 is positioned between an associated pump 16 and an associated valve 42 and is configured to measure and to display a pressure of the liquid product 22 in the respective feeder line 18.

The liquid product 22 distribution assembly 10 also may comprise a set of control modules 46, with each control module 46 being attached to a respective pump 16 and operationally engaged to an associated valve 42, as shown in FIG. 2. Each control module 46 comprises a microprocessor 48 and a receiver 50. When the user actuates the first transmitter 40, which may comprise a depressible button 52, the first transmitter 40 sends the liquid demand request to the microprocessor 48 via the receiver 50. The microprocessor 48 actuates the pump 16 and the valve 42 so that the liquid product 22 flows through an associated feeder line 18.

The present invention also anticipates a second transmitter (not shown), which is operationally engaged to the valve 42, and a third transmitter (not shown), which is operationally engaged to the pressure gauge 44. When paired with the first transmitter 40, completely wireless operation of the liquid product 22 distribution assembly 10 can be achieved. Additionally, with the pressure gauge 44 being communicatively engaged to the microprocessor 48, the pump 16 can be deactuated should the pressure in the feeder line 18 exceed a predetermined value.

One example of use is shown in FIG. 3, wherein a liquid hand soap container 24 is coupled with four supply lines 14, four pumps 16, four feeder lines 18, four valves 42, four pressure gauges 44, and four communicators 20 to supply liquid soap to sinks at four locations within a house. Such locations could include, for example, kitchen sinks, bathroom sinks, mudroom sinks, and the like.

Another example of use is shown in FIG. 4, wherein a liquid hand soap container 24 is coupled with one supply line 14, one pump 16, one feeder line 18, one valve 42, one pressure gauge 44, and two communicators 20 to supply liquid soap to sinks at two locations within a house. Each of a liquid shampoo container 26, a liquid hair moisturizer container 28, and a liquid body soap container 30 is coupled with one supply line 14, one pump 16, one (split) feeder line 18, one valve 42, one pressure gauge 44, and two communicators 20 to supply liquid shampoo, liquid hair moisturizer, and liquid body soap, respectively, to a bathtub and a shower at different locations within the house. A liquid dishwasher detergent container 32 is coupled with one supply line 14, one pump 16, one feeder line 18, one valve 42, one pressure gauge 44, and one communicator 20 to supply liquid dishwasher detergent to a dishwasher. Lastly, a liquid laundry soap container 34 is coupled with one supply line 14, one pump 16, one feeder line 18, one valve 42, one pressure gauge 44, and one communicator 20 to supply liquid laundry soap to a washing machine.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A liquid product distribution assembly comprising:

a set of reservoirs, each reservoir being configured to hold a respective liquid product;

a set of supply lines attached to the set of reservoirs, such that each reservoir is in fluidic communication with at least one supply line;

a set of pumps attached to the set of supply lines, such that each supply line is operationally engaged a respective pump;

a set of feeder lines attached to and extending from the set of pumps, such that each pump is in fluidic communication with at least one feeder line;

a set of communicators, each communicator being positioned proximate to an outlet port of a respective feeder line and in communicative engagement with an associated pump, positioning the communicator for communicating a liquid demand request to the associated pump, such that the associated pump is actuated and an associated liquid product is delivered through the outlet port, wherein the communicator comprises a wired connection or a first transmitter;

a set of valves, each valve being positioned in a respective feeder line between an associated pump and an outlet port of the respective feeder line, the valve being in communicative engagement with an associated pump, such that the valve is actuated to an open configuration concurrent with actuation of the associated pump; and a set of control modules, each control module being attached to a respective pump and operationally engaged to an associated valve, each control module comprising a microprocessor and a receiver, such that actuating the transmitter sends the liquid demand request to the microprocessor via the receiver, positioning the microprocessor for actuating the pump and the valve, such that the liquid product flows through an associated feeder line.

2. The liquid product distribution assembly of claim 1, wherein the set of reservoirs comprises a liquid hand soap container.

3. The liquid product distribution assembly of claim 1, wherein the set of reservoirs comprises one or more of liquid shampoo container, a liquid hair moisturizer container, and a liquid body soap container.

4. The liquid product distribution assembly of claim 1, wherein the set of reservoirs comprises one or both of a liquid dishwasher detergent container and a liquid laundry soap container.

5. The liquid product distribution assembly of claim 1, wherein the set of reservoirs comprises a liquid hand soap container, a liquid shampoo container, a liquid hair moisturizer container, a liquid body soap container, a liquid dishwasher detergent container, and a liquid laundry soap container.

6. The liquid product distribution assembly of claim 1, further including a set of pressure gauges, each pressure gauge being positioned in a respective feeder line, such that each feeder line is operationally engaged to a respective pressure gauge, the pressure gauge being positioned between an associated pump and an associated valve, wherein the pressure gauge is configured for measuring and displaying a pressure of the liquid product in the respective feeder line.

7. A liquid product distribution system comprising:

a set of reservoirs;

a set of liquid products, each liquid product being positioned in a respective reservoir;

a set of supply lines attached to the set of reservoirs, such that each reservoir is in fluidic communication with at least one supply line;

a set of pumps attached to the set of supply lines, such that each supply line is operationally engaged a respective pump;

a set of feeder lines attached to and extending from the set of pumps, such that each pump is in fluidic communication with at least one feeder line; and a set of communicators, each communicator being positioned proximate to an outlet port of a respective feeder line and in communicative engagement with an associated pump, positioning the communicator for communicating a liquid demand request to the associated pump, such that the associated pump is actuated and an associated liquid product is delivered through the outlet port, wherein the communicator comprises a wired connection or a first transmitter;

a set of valves, each valve being positioned in a respective feeder line between an associated pump and an outlet port of the respective feeder line, the valve being in communicative engagement with an associated pump, such that the valve is actuated to an open configuration concurrent with actuation of the associated pump; and a set of control modules, each control module being attached to a respective pump and operationally engaged to an associated valve, each control module comprising a microprocessor and a receiver, such that actuating the transmitter sends the liquid demand request to the microprocessor via the receiver, positioning the microprocessor for actuating the pump and the valve, such that the liquid product flows through an associated feeder line.

8. The liquid product distribution system of claim 7, wherein the set of reservoirs comprises one or more of:

a liquid hand soap container containing a liquid soap;

a liquid shampoo container containing a liquid shampoo;

a liquid hair moisturizer container containing a liquid hair moisturizer;

a liquid body soap container containing a liquid body soap;

a liquid dishwasher detergent container containing a liquid dishwasher detergent; and a liquid laundry soap container containing a liquid laundry soap.

9. The liquid product distribution system of claim 7, further including a set of pressure gauges, each pressure gauge being positioned in a respective feeder line, such that each feeder line is operationally engaged to a respective pressure gauge, the pressure gauge being positioned between an associated pump and an associated valve, wherein the pressure gauge is configured for measuring and displaying a pressure of the liquid product in the respective feeder line.

10. A liquid product distribution assembly comprising:

a set of reservoirs, each reservoir being configured to hold a respective liquid product, the set of reservoirs comprising a liquid hand soap container, a liquid shampoo container, a liquid hair moisturizer container, a liquid body soap container, a liquid dishwasher detergent container, and a liquid laundry soap container;

a set of supply lines attached to the set of reservoirs, such that each reservoir is in fluidic communication with at least one supply line;

a set of pumps attached to the set of supply lines, such that each supply line is operationally engaged a respective pump;

a set of feeder lines attached to and extending from the set of pumps, such that each pump is in fluidic communication with at least one feeder line;

a set of communicators, each communicator being positioned proximate to an outlet port of a respective feeder line and in communicative engagement with an associated pump, positioning the communicator for communicating a liquid demand request to the associated pump, such that the associated pump is actuated and an associated liquid product is delivered through the outlet port, the communicator comprising a wired connection or a first transmitter;

a set of valves, each valve being positioned in a respective feeder line between an associated pump and an outlet port of the respective feeder line, the valve being in communicative engagement with an associated pump, such that the valve is actuated to an open configuration concurrent with actuation of the associated pump;

a set of pressure gauges, each pressure gauge being positioned in a respective feeder line, such that each feeder line is operationally engaged to a respective pressure gauge, the pressure gauge being positioned between an associated pump and an associated valve, wherein the pressure gauge is configured for measuring and displaying a pressure of the liquid product in the respective feeder line; and a set of control modules, each control module being attached to a respective pump and operationally engaged to an associated valve, each control module comprising a microprocessor and a receiver, such that actuating the transmitter sends the liquid demand request to the microprocessor via the receiver, positioning the microprocessor for actuating the pump and the valve, such that the liquid product flows through an associated feeder line.

* * * * *